3,063,982
OXYGENATED DERIVATIVES OF CELLULOSE
Lucien Peras, Billancourt, France, assignor to Regie Nationale des Usines Renault, Billancourt, France
No Drawing. Filed July 31, 1959, Ser. No. 830,951
Claims priority, application France Aug. 14, 1958
7 Claims. (Cl. 260—231)

It is known to prepare allyl ethers of cellulose according to a process whereby the fibrous structure of the material and its good mechanical properties can be preserved while maintaining the reactivity of the allyl group.

According to this process, an alkali-cellulose is caused to react on an allyl halide such as allyl chloride or bromide, used either alone or in combination, diluted or not by a suitable solvent. This mode of preparation is characterized by the following points:

(a) The alkali-cellulose is prepared by contact between cellulose and an alkaline hydroxide solution of a concentration ranging from 10% to 30% by weight at a temperature below 40° C., the time of this contact varying from a few minutes to several hours;

(b) The reaction of the allyl halide with the alkali-cellulose is accomplished at a temperature below 40° C., the duration of this reaction extending to several days.

Good results are also reported when the allyl bromide in solution in carbon tetrachloride is caused to react with sodium or potassium alkali-cellulose in an inert atmosphere.

The allyl cellulose obtained according to the methods broadly set forth hereinabove displays the chemical reaction capacities of hydroxyl functions and double bonds. Moreover, it may be rendered soluble in organic solvents by esterification such as acetylation, or by etherification.

This invention relates to novel products consisting of oxygenated derivatives of cellulose the preparation of which is based on the discovery of the exceptional aptitude of allyl-cellulose to react with various oxygenating reagents. The advantages offered by the oxygenated products thus obtained is that they make possible the fixation of a great number of chemical functions on the cellulose chain in the form of oxygenated allyl portions and the grafting of unsaturated monomers without requiring the addition of any polymerization catalyst.

The novel products thus discovered comprise peroxide, epoxy or ozonide groups. They can be represented by the following simplified general formulae:

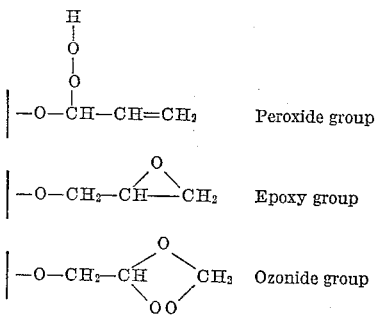

wherein the vertical line represents the cellulose chain having the following structure:

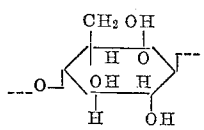

They are obtained, according to this invention, by using certain reagents which may be classified as follows:

Atmospheric oxygen or pure, variously diluted oxygen, notably in the presence of visible radiation, such as ultraviolet, infrared or γ rays, Ozone or air-ozone and oxygen-ozone mixtures, Organic peroxides such as benzoyl peroxide, perbenzoic acid, cumene peroxide, and methylethylketone.

The allyl-cellulose should consist of a product prepared by causing an allyl halide to react with alkali-cellulose at a temperature lower than or equal to 40° C. Thus, alkali-cellulose is prepared by impregnating cellulose with a caustic soda solution of a concentration ranging from 10% to 30% by weight. Thus, by impregnating 1,000 grams of cotton linters with a 10-liter batch of a 15% (by weight) caustic soda solution, and subsequently drying the mix until 6 liters of liquid have been removed, an alkali-cellulose particularly suitable for preparing the allyl-cellulose is obtained. The latter may be obtained by treating the mass of alkali-cellulose with 10 kilograms of an allyl bromide solution in carbon tetrachloride of a 27% concentration while stirring at 40° C. for eight hours. The reaction product is filtered and washed with carbon tetrachloride, then with isopropyl alcohol, and finally with water until the alkalinity is eliminated. The resulting allyl-cellulose comprises .70 allyl group per cellulose unit. Less substituted products may be obtained by reducing the reaction time, the temperature, or the concentration of the allyl bromide solution.

Allyl-celluloses containing less than .25 allyl per cellulose unit react only moderately in the presence of oxygenating reagents and it is preferable to use a more substituted product. The maximum reactivity is obtained with allyl-celluloses containing at least .70 allyl. These substances are so sensitive that even in darkness they absorb atmospheric oxygen and become loaded with peroxides to the extent of fusing when they are brought into contact with sulphuric acid (see Example 1).

The oxygenated derivatives of allyl-cellulose may be characterized by what may be termed as their "activity," i.e. the number of active oxygen moles per 100 grams of substance. This "activity" is measured by titrating the iodine released when heating the cellulose material with isopropanol acidified with acetic acid and to which a concentrated solution of potassium iodide has been added. The activity of the cellulose and of the freshly prepared allyl-celluloses is extremely low, of the order of $.01 \times 10^{-2}$. The activity can be increased up to about $10 \times 10^{-2}$.

The following examples illustrate various methods of preparing the oxygenated derivatives of cellulose from allyl-celluloses, the latter being obtained from a natural cellulose substance such as ramie, jute, linen, hemp, sisal, or wood fibers, or from a synthetic cellulose substance such as regenerated or reclaimed cellulose, as well as from cellulose esters and ethers.

Example 1.—An allyl-cellulose comprising .85 allyl group per cellulose unit and displaying, after its preparation, an activity of $.1 \times 10^{-2}$, is left in the dark in the presence of air. After five months of preservation at room temperature, its activity rises to $3.8 \times 10^{-2}$. The resulting product has the peculiar property of decomposing by fusing when brought into contact with a drop of sulphuric acid.

Example 2.—An allyl-cellulose comprising .80 allyl group per cellulose unit and displaying, after its preparation, an activity of $.4 \times 10^{-2}$ is left in daylight in the presence of pure oxygen. After three days of the oxidizing process the activity of the allyl-cellulose has risen to $3.6 \times 10^{-2}$.

Example 3.—Three allyl-cellulose comprising .28, .44, and .77 allyl groups respectively per cellulose unit are treated in the presence of oxygen with γ radiation issuing from a source of 5 curies of radio-active iridium spaced 10 centimeters from the samples. After 75 hours of this treatment, the activities of the three allyl-celluloses are, respectively, $.05 \times 10^{-2}$, $.13 \times 10^{-2}$ and $.28 \times 10^{-2}$.

*Example 4.*—An allyl-cellulose comprising .30 allyl group per cellulose unit and displaying after its preparation an activity of $.01 \times 10^{-2}$ is treated for five minutes at room temperature by means of an ozonized oxygen stream (containing .80% of ozone). The activity is then $.70 \times 10^{-2}$.

*Example 5.*—An allyl-cellulose comprising .63 allyl group per cellulose unit and displaying, after its preparation, an activity of $.1 \times 10^{-2}$ is treated at room temperature with a benzene solution containing 10% of benzoyl peroxide (300 cc. of solution per 10 grams of allyl-cellulose). After 4 days of contact the allyl-cellulose has an activity of $.30 \times 10^{-2}$. After 14 days, this activity increases to $1.6 \times 10^{-2}$.

*Example 6.*—An allyl-cellulose comprising .30 allyl group per cellulose unit and displaying, after its preparation, an activity of $.01 \times 10^{-2}$ is treated for four hours at 50° C. with a benzene solution containing 1% by weight of benzoyl peroxide. The cellulose material thus obtained has an activity of $.32 \times 10^{-2}$.

*Example 7.*—An allyl-cellulose comprising .28 allyl group per cellulose unit and displaying, after its preparation, an activity of $.01 \times 10^{-2}$ is treated for 10 days at 20° C. with a benzene solution containing 1% by weight of cumene peroxide. The resulting cellulose material has an activity of $.31 \times 10^{-2}$.

*Example 8.*—A jute comprising .57 allyl group per cellulose unit is treated at 50° C. with a benzene solution containing 1% of benzoyl peroxide. After an 8-hour reaction the activity of the resulting product is $.23 \times 10^{-2}$.

The cellulose compounds obtained according to the methods set forth hereinabove and illustrated by the above Examples 1 to 8 are extremely interesting, as indicated, for they make it possible to fix a great number of chemical functions on the cellulose chain, and to graft unsaturated monomers on the cellulose chain without adding any polymerization catalyst.

I claim:

1. Oxygenated allyl celluloses wherein oxidation is on the allyl portion of the molecule and comprises an oxygenated allyl portion selected from the group consisting of a peroxide of the formula

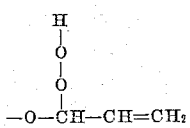

an epoxide of the formula

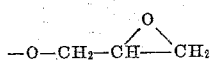

and an ozonide of the formula

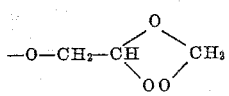

said oxygenated allyl celluloses being characterized by an activity ranging from $0.01 \times 10^{-2}$ to $10 \times 10^{-2}$, said activity being the number of active oxygen molecules per hundred grams of the oxygenated allyl cellulose.

2. Oxygenated allyl celluloses wherein oxidation is on the allyl portion of the molecule and comprises an oxygenated allyl portion selected from the group consisting of a peroxide of the formula

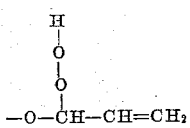

an epoxide of the formula

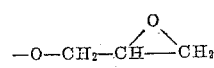

and an ozonide of the formula

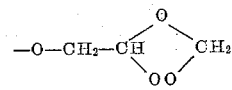

said oxygenated allyl celluloses being characterized by an activity ranging from $0.01 \times 10^{-2}$ to $10 \times 10^{-2}$, said activity being the number of active oxygen molecules per hundred grams of the oxygenated allyl cellulose, said oxygenated function being introduced into the molecule by reacting an allyl cellulose with a member of the group consisting of oxygen, ozone, and a peroxide.

3. Oxygenated allyl celluloses wherein oxidation is on the allyl portion of the molecule and comprises an oxygenated allyl portion which is an epoxide of the formula

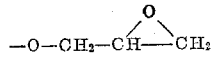

said oxygenated allyl celluloses being characterized by an activity ranging from $0.01 \times 10^{-2}$ to $10 \times 10^{-2}$, said activity being the number of active oxygen molecules per hundred grams of the oxygenated allyl cellulose.

4. Oxygenated allyl celluloses wherein oxidation is on the allyl portion of the molecule and comprises an oxygenated allyl portion which is a peroxide of the formula

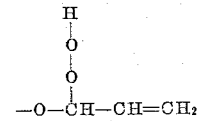

said oxygenated allyl celluloses being characterized by an activity ranging from $0.01 \times 10^{-2}$ to $10 \times 10^{-2}$, said activity being the number of active oxygen molecules per hundred grams of the oxygenated allyl cellulose.

5. Oxygenated allyl celluloses wherein oxidation is on the allyl portion of the molecule and comprises an oxygenated allyl portion which is an ozonide of the formula

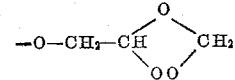

said oxygenated allyl celluloses being characterized by an activity ranging from $0.01 \times 10^{-2}$ to $10 \times 10^{-2}$, said activity being the number of active oxygen molecules per hundred grams of the oxygenated allyl cellulose.

6. Oxygenated allyl celluloses wherein oxidation is on the allyl portion of the molecule and comprises an oxygenated allyl portion selected from the group consisting of a peroxide of the formula

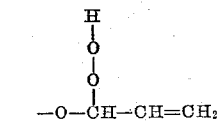

an epoxide of the formula

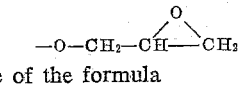

and an ozonide of the formula

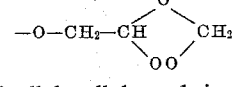

said oxygenated allyl celluloses being characterized by an activity ranging from $0.01 \times 10^{-2}$ to $10 \times 10^{-2}$, said activity being the number of active oxygen molecules per hundred grams of the oxygenated allyl cellulose, and said allyl cellulose being an allyl derivative of a natural cellulose substance selected from the group consisting of ramie, jute, linen, hemp, sisal, and wood fibers.

7. Oxygenated allyl celluloses wherein oxidation is on the allyl portion of the molecule and comprises an oxygenated allyl portion selected from the group consisting of a peroxide of the formula

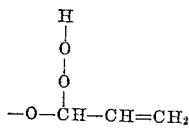

an epoxide of the formula

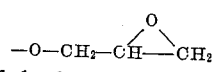

and an ozonide of the formula

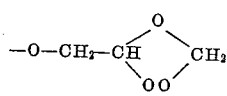

said oxygenated allyl celluloses being characterized by an activity ranging from $0.01 \times 10^{-2}$ to $10 \times 10^{-2}$, said activity being the number of active oxygen molecules per hundred grams of the oxygenated allyl cellulose, and said allyl cellulose being an allyl derivative of a synthetic cellulose substance selected from the group consisting of reclaimed cellulose, cellulose esters, and cellulose ethers.

References Cited in the file of this patent
UNITED STATES PATENTS

| | | |
|---|---|---|
| 1,910,440 | Lilienfeld | May 23, 1933 |
| 2,131,120 | Schlack | Sept. 27, 1938 |